(12) United States Patent
Kim et al.

(10) Patent No.: US 10,007,389 B2
(45) Date of Patent: Jun. 26, 2018

(54) TOUCH WINDOW AND TOUCH DEVICE

(71) Applicant: LG INNOTEK CO., LTD., Seoul (KR)

(72) Inventors: Do Young Kim, Seoul (KR); Ji Won Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 30 days.

(21) Appl. No.: 14/607,797

(22) Filed: Jan. 28, 2015

(65) Prior Publication Data

US 2015/0242029 A1    Aug. 27, 2015

(30) Foreign Application Priority Data

Jan. 28, 2014 (KR) .................. 10-2014-0010738

(51) Int. Cl.

| | |
|---|---|
| *G06F 3/046* | (2006.01) |
| *G06F 3/044* | (2006.01) |
| *G06F 3/047* | (2006.01) |
| *G06F 3/0354* | (2013.01) |
| *G09G 5/00* | (2006.01) |

(52) U.S. Cl.
CPC .......... *G06F 3/047* (2013.01); *G06F 3/03545* (2013.01); *G06F 3/044* (2013.01); *G06F 3/046* (2013.01); *G09G 5/003* (2013.01); *G09G 2300/04* (2013.01)

(58) Field of Classification Search
None
See application file for complete search history.

(56) References Cited

U.S. PATENT DOCUMENTS

| | | | | |
|---|---|---|---|---|
| 2005/0237439 A1* | 10/2005 | Mai | .................. | G06F 3/045 349/12 |
| 2009/0107736 A1* | 4/2009 | Ben-Eliyahu | ........... | G06F 3/044 178/18.01 |
| 2010/0026656 A1* | 2/2010 | Hotelling | ................ | G06F 3/044 345/174 |
| 2011/0193818 A1* | 8/2011 | Chen | ...................... | G06F 3/041 345/174 |
| 2013/0002614 A1 | 1/2013 | Nowatzyk et al. | | |
| 2013/0201122 A1* | 8/2013 | Kurashima | ............. | G06F 3/041 345/173 |
| 2013/0207925 A1* | 8/2013 | Ryshtun | ................ | G06F 3/0416 345/174 |
| 2014/0043284 A1* | 2/2014 | Park | ....................... | G06F 3/044 345/174 |
| 2014/0062921 A1* | 3/2014 | Cho | ........................ | G06F 3/041 345/173 |
| 2014/0333574 A1* | 11/2014 | Xi | ........................... | G06F 3/046 345/174 |
| 2014/0354560 A1* | 12/2014 | Kim | ........................ | G06F 3/041 345/173 |

FOREIGN PATENT DOCUMENTS

JP    2014-49123 A    3/2014

* cited by examiner

*Primary Examiner* — Christopher Kohlman
(74) *Attorney, Agent, or Firm* — Birch, Stewart, Kolasch & Birch, LLP (57) ABSTRACT

A touch window according to an embodiment includes a cover substrate on which a first area and a second area are defined; a coil on the second area of the cover substrate; a first substrate on the cover substrate; and a sensing electrode on the first substrate.

14 Claims, 12 Drawing Sheets

TOUCH WINDOW AND TOUCH DEVICE

CROSS-REFERENCE TO RELATED APPLICATION

This application claims under 35 U.S.C. § 119 to Korean Patent Application No. 10-2014-0010738 filed 2014 Jan. 28, which is hereby incorporated by reference in its entirety.

BACKGROUND

The disclosure relates to a touch window.

Recently, a touch panel for inputting specific commands through the touch of an image displayed on a display device by an input device, such as a stylus pen or a finger, has been applied to various electronic appliances.

An EMR (electro magnetic resonance) scheme has been expensively used as an input scheme of a stylus pen. According to the EMR scheme, a coil is arranged on a printed circuit board and voltage is applied to the coil to transmit power. Due to the transmitted power, electromagnetic waves are generated and the electromagnetic waves are absorbed in an EMR pen. The EMR pen may include a condenser and a loop and can emit again the absorbed electromagnetic waves at a predetermined frequency.

The electromagnetic waves emitted from the EMR pen are again absorbed in the coil of the printed circuit board, so it is possible to determine the location of the EMR pen in a touch screen.

In this case, the power transmission is achieved by resonance and the coil requires a very low impedance characteristic.

SUMMARY

The embodiment provides a touch window which can be driven in a capacitive scheme and an EMR scheme.

According to the embodiment, there is provided a touch window including a cover substrate on which a first area and a second area are defined; a coil on the second area of the cover substrate; a first substrate on the cover substrate; and a sensing electrode on the first substrate.

According to the embodiment, the coil is disposed on the cover substrate, so the thickness of the touch window can be prevented from being increased. That is, if the coil is formed on a separate layer, the cost and the thickness may be increased, but the embodiment can solve this problem. Therefore, the position sensing by the capacitance and the position sensing by the EMR pen can be simultaneously performed with a simple structure.

The coil may be disposed on a printing layer. Thus, the high-temperature process or the high-temperature treatment can be performed when forming the coil. That is, if the coil formed on a film is subject to the high-temperature treatment, the film may be damaged. However, according to the embodiment, the coil is formed on the printing layer having high resistance against the high temperature, so the reliability of the process and the product can be improved.

Meanwhile, when the position is sensed by capacitance detected as the finger touches the touch window, the coil may serve as a ground electrode. That is, the coil may prevent static electricity or ESD (electrostatic discharge).

DETAILED DESCRIPTION OF THE EMBODIMENTS

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer (film), region, pattern, or structure shown in the drawings may be exaggerated, omitted or schematically drawn for the purpose of convenience or clarity. In addition, the size of each layer (film), region, pattern, or structure does not utterly reflect an actual size.

Hereinafter, embodiments will be described in detail with reference to accompanying drawings.

Figure 1:
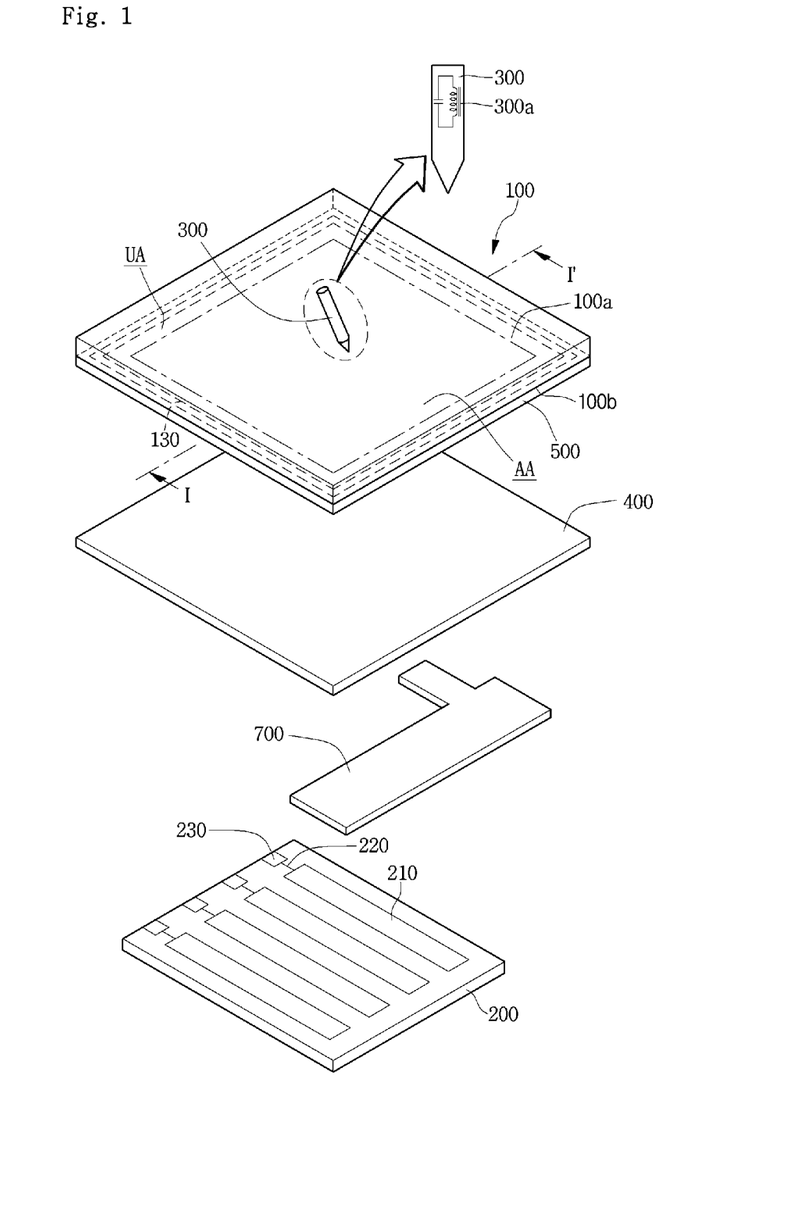
FIG. 1 is an exploded perspective view showing a touch window according to an embodiment.
Figure 2:
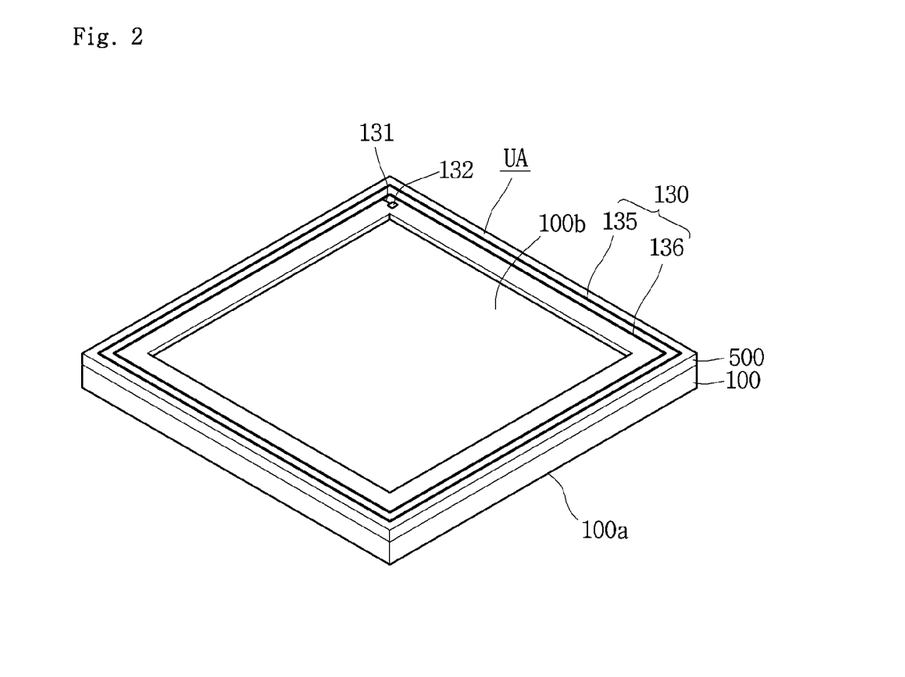
FIG. 2 is a perspective view showing a bottom of a touch window according to an embodiment.
Figure 3:
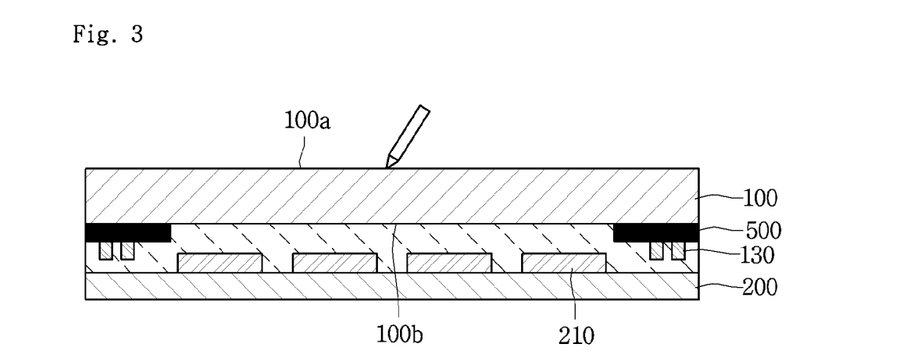
FIG. 3 is a sectional view taken along line I-I' of FIG. 1.

Referring to FIGS. 1 to 3, a touch window according to the embodiment may include a cover substrate 100, a first substrate 200 and a circuit board 700.

The cover substrate 100 may be disposed at the rightmost part of the touch window. Thus, the cover substrate 100 can protect various components disposed under the cover substrate 100. An input device, such as a finger or a digitizer, may touch a top surface of the cover substrate 100. The cover substrate 100 may be flexible or rigid. For example, the cover substrate 100 may include glass or plastic. In detail, the cover substrate 100 may include chemically tempered/half-tempered glass such as soda lime glass or aluminosilicate glass, reinforced or flexible plastic such as polyimide (PI), polyethylene terephthalate (PET), propylene glycol (PPG), or polycarbonate (PC), or sapphire.

In addition, the cover substrate 100 may include an optical isotropic film. For example, the cover substrate 100 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, the cover substrate 100 may have a curved portion to be bent. That is, the cover substrate 100 may be bent to have a partial flat surface and a partial curved surface. In detail, an end of the cover substrate 100 may be bent to have a curved surface or may be bent or flexed to have a surface including a random curvature.

Further, the cover substrate 100 may include a flexible substrate 100 having a flexible property.

In addition, the cover substrate 100 may be a curved substrate or a bended substrate. That is, the touch window having the cover substrate 100 may be formed to have a flexible, curved or bended property. For this reason, the touch window according to the embodiment may be easily portable and may be variously changed in design.

A sensing electrode, a wire electrode and the circuit board 700 may be disposed on the cover substrate 100, but the embodiment is not limited thereto. That is, the cover substrate 100 may be a support substrate.

The cover substrate 100 may have a first area AA and a second area UA defined therein.

An image may be displayed in the first area AA. The image is not displayed in the second area UA provided at a peripheral portion of the first area AA.

In addition, the position of an input device (e.g., finger) may be sensed in at least one of the first area AA and the second area UA. If the input device, such as a finger, touches the touch window, the variation of capacitance occurs in the touched part by the input device, and the touched part subject to the variation of capacitance may be detected as a touch point.

For instance, the cover substrate 100 may be defined as the first area AA and the second area UA surrounding the first area AA.

In addition, the cover substrate 100 may be defined as the first area AA and the second area UA disposed at both ends of the first area AA. The first substrate 200 may be disposed at a position corresponding to the first area AA. That is, the first substrate 200 may overlap with the first area AA. Thus, the touch and information input may be achieved in the first area AA.

For example, the first substrate 200 may have a size corresponding to the first area AA and may overlap with the first area AA of the cover substrate 100 without overlapping with the second area UA.

The first substrate 200 may have a material and/or a property identical to that of the cover substrate 100.

An adhesive layer 400 may be further disposed between the cover substrate 100 and the first substrate 200. The adhesive layer 400 may be an optical transparent adhesive.

The coil 130 is disposed on the second area UA. In detail, the cover substrate 100 may include one surface 100a, to which a touch command input is performed by a user, and the other surface 100b opposite to the one surface 100a. The coil 130 may be disposed at an edge of the other surface 100b.

Therefore, the coil 130 may be disposed in all regions except for the region where the first substrate 200 is disposed. The coil 130 may not make contact with the first substrate 200. The coil 130 may not overlap with the first substrate 200. For instance, the coil 130 may have a loop shape, but the embodiment is not limited thereto. Thus, an electrode base disposed on the first substrate 200 may not electrically interfere with the coil 130. That is, according to the embodiment, the interference between the coil 130 and the sensing electrode may be solved by spacing the coil 130 from the sensing electrode without providing an additional shielding member for the coil 130 and the sensing electrode.

The coil 130 may extend along an edge of the second area UA. Referring to FIG. 2, the coil 130 may include a first coil 135 and a second coil 136 spaced apart from the first coil 135. The first and second coils 135 and 136 may extend while surrounding the edge of the second area UA.

The coil 130 may have various line widths unless overlapping with the first substrate 200.

A wire 131 may be connected to the coil 130 to transmit power. A pad part 132 may be further disposed at the end of the wire 131 and the pad part 132 may be connected to the circuit board 700.

The coil 130 may include a conductive material. For example, the coil 130 may include metal oxide, such as indium tin oxide, indium zinc oxide, copper oxide, tin oxide, zinc oxide, or titanium oxide.

In addition, the coil may include a nanowire, a photosensitive nanowire film, carbon nanotube (CNT), graphene, conductive polymer or a mixture thereof.

Especially, since the coil 130 may be disposed on the second area UA, the coil 130 may include an opaque conductive material.

For instance, the coil 130 may include various metals. For example, the coil 130 may include at least one of Cr, Ni, Cu, Al, Ag, Mo, Au, Ti and an alloy thereof.

If the coil 130 is formed by using the metal, the coil 130 may have a low resistance and power can be transmitted with high efficiency by using a digitizer pen 300.

A printing layer 500 may be formed in the second area UA. The printing layer 500 may cover the coil 130 and the circuit board 700 such that the coil 130 and the circuit board 700 cannot be viewed from the outside. The printing layer 500 may be coated with a material having a predetermined color. That is, the printing layer 500 may have a color suitable for a desired outer appearance thereof. For example, the printing layer 500 may include black or white pigments to represent black or white. Otherwise, various color films can be used to express various colors, such as red and blue.

The printing layer 500 may be formed through one-color printing, two-color printing or three-color printing. The printing layer 500 may be formed by coating black ink or white ink according to the desired outer appearance thereof. A pattern may be formed on the printing layer 500 to realize a desired logo. That is, the desired logo may be formed in the printing layer 500 through various schemes. The printing layer 500 may be formed through deposition, print, and wet coating schemes. The printing layer 500 may have at least one layer. For instance, the printing layer 500 may be prepared as a single layer or as at least two layers having widths different from each other.

At this time, the coil 130 may be disposed on the printing layer 500.

In detail, the printing layer 500 may directly make contact with the second area UA of the other surface 100b of the cover substrate 100. In addition, the coil 130 may directly make contact with the other surface of the printing layer 500 when one surface of the printing layer 500 makes contact with the other surface 100b of the cover substrate 100.

Thus, the high-temperature process or the high-temperature treatment can be performed when forming the coil 130. That is, if the coil 130 formed on a film is subject to the high-temperature treatment, the film may be damaged. However, according to the embodiment, the coil 130 is formed on the printing layer 500 having high resistance against the high temperature, so the reliability of the process and the product can be improved.

Meanwhile, the sensing electrode 210 and a wire electrode 220 may be disposed on the first substrate 200. In detail, one surface of the adhesive layer 400 may be disposed on the other surface 100b of the cover substrate 100 and the first substrate 200 may be disposed on the other surface of the adhesive layer 400. That is, the adhesive layer 400 may be interposed between the cover substrate 100 and the first substrate 200.

The sensing electrode 210 may sense the input device. Although FIG. 1 shows the sensing electrode 210 in the form of a bar, the embodiment is not limited thereto. The sensing electrode 210 may have various shapes if it can sense the touch of the input device, such as a finger.

The sensing electrode 210 may include a transparent conductive material which allows electricity to flow therethrough without interfering with light transmission. For instance, the sensing electrode 210 may include metal oxide, such as indium tin oxide, indium zinc oxide, copper oxide, tin oxide, zinc oxide, or titanium oxide.

In addition, the sensing electrode 210 may include a nanowire, a photosensitive nanowire film, carbon nanotube (CNT), graphene, conductive polymer or a mixture thereof.

The sensing electrode 210 may include various metals. For example, the sensing electrode 210 may include at least one of Cr, Ni, Cu, Al, Ag, Mo, Au, Ti and an alloy thereof.

The sensing electrode 210 (or wire electrode) may have a mesh shape. In detail, the sensing electrode 210 may have a plurality of sub-electrodes which cross each other in the mesh shape.

In detail, the sensing electrode 210 may include mesh lines and mesh openings between the mesh lines due to the sub-electrodes which cross each other in the mesh shape.

The mesh line may have a line width in the range of about 0.1 µm to about 10 µm. If the mesh line has a line width less than 0.1 µm, it may be impossible to form the mesh line through the manufacturing process or the short circuit may occur in the mesh line. If the mesh line has a line width above 10 µm, the electrode pattern may be viewed from the outside so the visibility may be lowered. Preferably, the line width of the mesh line may be in the range of 0.5 µm to 7 µm. More preferably, the line width of the mesh line may be in the range of 1 µm to 3.5 µm.

The mesh opening may have various shapes. For instance, the mesh opening may have various shapes such as a polygonal shape including a rectangular shape, a diamond shape, a pentagonal shape or a hexagonal shape, or a circular shape. In addition, the mesh opening may have a regular shape or a random shape.

Since the sensing electrode 210 has the mesh shape, it is possible to hide the pattern of the sensing electrode 210 on the first area AA, that is, the display area. That is, even though the sensing electrode 210 is formed of metal, the pattern may not be viewed. In addition, even if the sensing electrode 210 is applied to a large-size touch window, the resistance of the touch window may be lowered.

Although FIG. 1 shows the sensing electrode 210 extending in one direction, the embodiment is not limited thereto. The sensing electrode 210 may include a sensing electrode extending in one direction and a sensing electrode extending in the other direction crossing the one direction.

An electromagnetic touch object, such as the digitizer pen 300, may touch the one surface 100a of the cover substrate 100. A resonance circuit 300a may be provided in the digitizer pen 300 and the sensing electrode 210 senses the position of the digitizer pen 300 by detecting a signal generated from the resonance circuit 300a.

Although it has been illustrated that the coil 130 transmits the power and the sensing electrode 210 receives the power, this is illustrative purpose only. The sensing electrode 210 may transmit the power and the coil 130 may receive the power.

In detail, the electromagnetic waves are generated as the power is transmitted to the coil 130 arranged on the touch window. The electromagnetic waves are absorbed in the digitizer pen 300 and the digitizer pen 300 may emit again the electromagnetic waves at a predetermined frequency. Thus, the sensing electrode 210 can detect the position of the digitizer pen 300 by sensing electromagnetic variation that occurs according to the approach of the digitizer pen 300.

Meanwhile, when the finger touches the cover substrate 100, the sensing electrode 210 may detect the contact position by sensing the capacitance variation.

According to the embodiment, the coil 130 is disposed on the cover substrate 100, so the thickness of the touch window can be prevented from being increased. That is, if the coil 130 is formed on a separate layer, the cost and the thickness may be increased, but the embodiment can solve this problem. Therefore, the position sensing by the capacitance and the position sensing by the EMR can be simultaneously performed with a simple structure.

Meanwhile, when the position is sensed by the capacitance detected as the finger touches the touch window, the coil 130 may serve as a ground electrode. That is, the coil 130 may prevent static electricity or ESD (electrostatic discharge) in the touch window. That is, the static electricity or ESD may flow along a path of the coil 130, so the static electricity or ESD may not be introduced into the touch window. Since the coil 130 is arranged along the edge of the cover substrate 100, the static electricity or ESD introduced into the touch window can be effectively blocked. The coil 130 may be arranged along the entire edge of the cover substrate 100. The coil 130 may be connected to the circuit board 700 to discharge the ESD in the touch window as an electric signal. Thus, the signal interference can be prevented, so that the accuracy and reliability of the touch operation can be ensured.

The wire electrode 220 may be disposed on the first substrate 200 to electrically connect the sensing electrodes 210. The wire electrode 220 may be formed of a metal having superior electric conductivity. The wire electrode 220 may include a conductive material. For instance, the wire electrode 220 may include a material identical to a material constituting the sensing electrode 210 described above A wire pad part 230 is disposed at the end of the wire electrode 220. The wire pad part 230 may be connected to the circuit board 700. The wire pad part 230 may be connected to a connection part 310 of the circuit board 700.

The circuit board 700 may include various types of circuit boards. For instance, the circuit board 700 may include a flexible printed circuit board (FPCB).

Although not shown in the drawings, a connector and a driving chip may be mounted on the circuit board 700.

Meanwhile, hereinafter, a touch window according to another embodiment will be described with reference to FIG. 4. The details of structures or components the same as or similar to those of the above-described embodiments will be omitted for the purpose of convenience or clarity.

Figure 4:
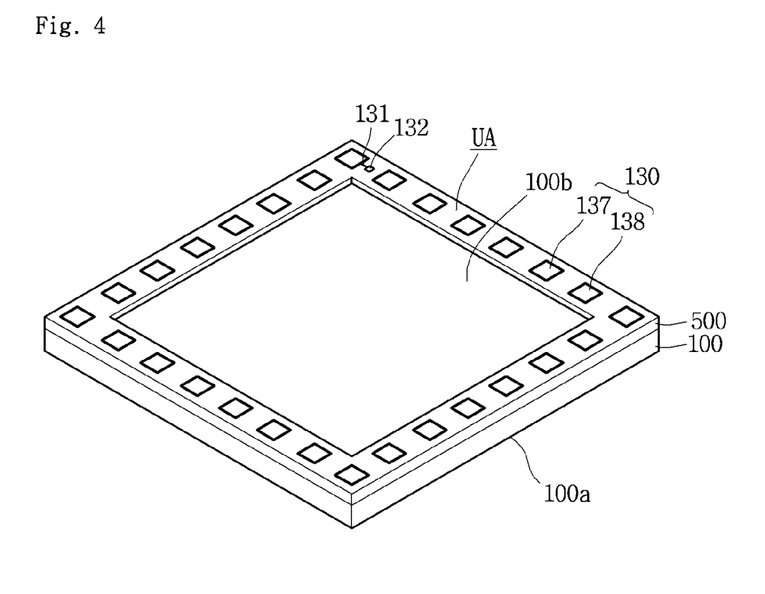
FIG. 4 is a perspective view showing a bottom of a touch window according to another embodiment.

Referring to FIG. 4, the coil 130 may include a first coil 137 and a second coil 138. The first and second coils 137 and 138 may have the same or similar shape and size. The first and second coils 137 and 138 may have a ring shape. The first and second coils 137 and 138 may be arranged along an edge of the second area UA. In detail, a plurality of first and second coils 137 and 138 may be arranged along the edge of the second area UA.

Hereinafter, a touch window according to still another embodiment will be described with reference to FIG. 5. The details of structures or components the same as or similar to those of the above-described embodiments will be omitted for the purpose of convenience or clarity.

Figure 5:
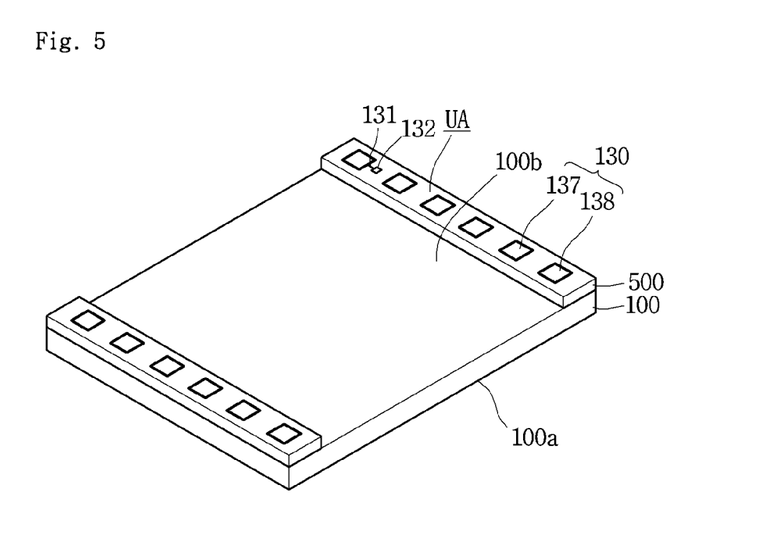
FIG. 5 is a perspective view showing a bottom of a touch window according to still another embodiment.

Referring to FIG. 5, the coil 130 may include a first coil 137 and a second coil 138. The first and second coils 137 and 138 may have the same or similar shape and size. The first and second coils 137 and 138 may have a ring shape. The first and second coils 137 and 138 may be arranged along an edge of the second area UA. A plurality of first and second coils 137 and 138 may be arranged along the edge of the second area UA.

In this case, as shown in FIG. 5, the second area UA may be disposed only at both ends of the first area AA. Thus, the first and second coils 137 and 138 may be arranged on the second area UA disposed at both ends of the first area AA.

Such an arrangement can reduce or remove the thickness of the bezel formed at both sides of the touch window. Thus, the design limitation of the touch window caused by the bezel can be overcome.

Figure 6:
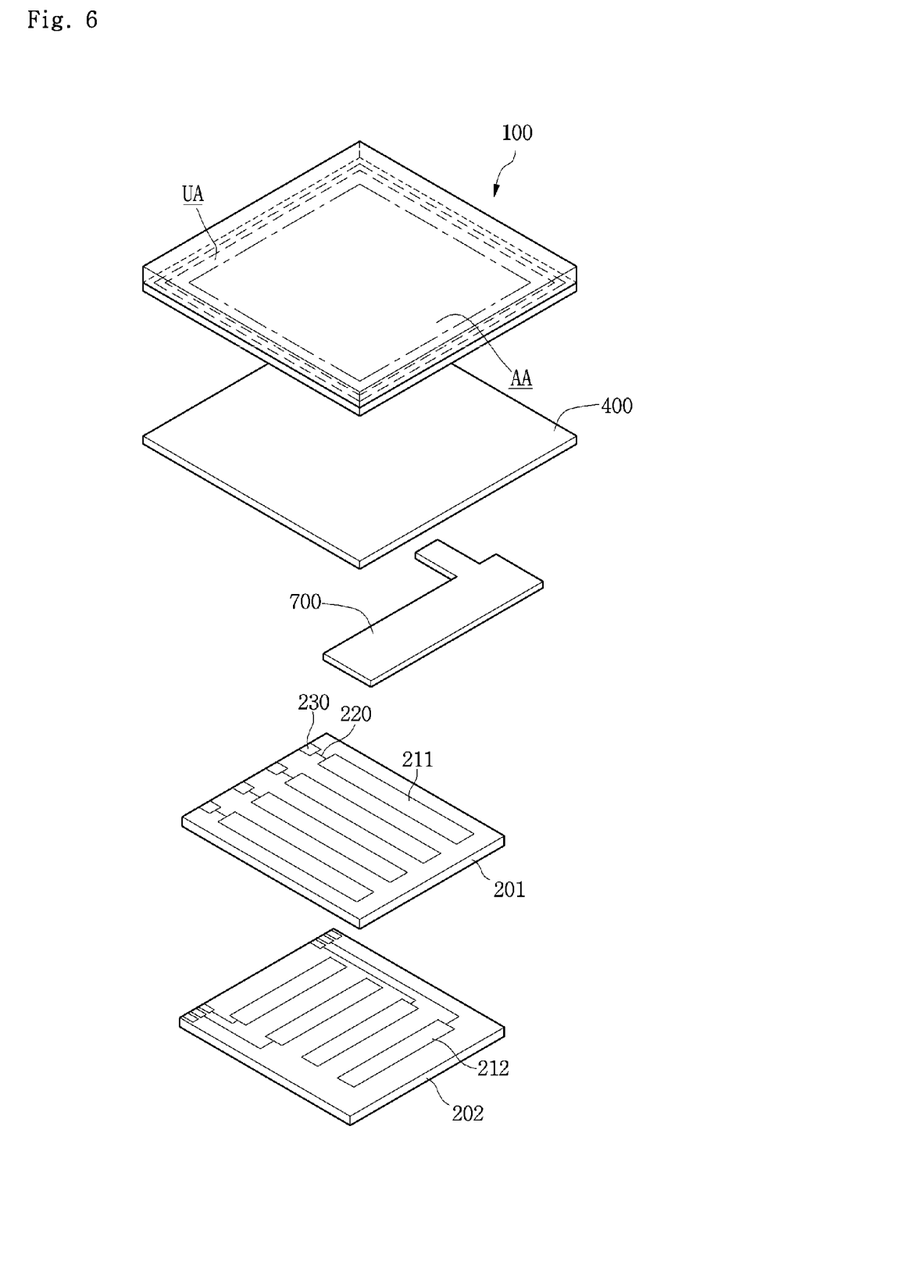
FIGS. 6 to 9 are exploded perspective views showing a touch window according to another embodiment.

Meanwhile, referring to FIG. 6, in the touch window according to another embodiment, a second substrate 202 may be disposed under a first substrate 201. In addition, a second sensing electrode 212 may be disposed on the second substrate 202. That is, the first and second sensing electrodes 211 and 212 may be disposed on mutually different substrates, so the touch window may have various structures.

Figure 7:
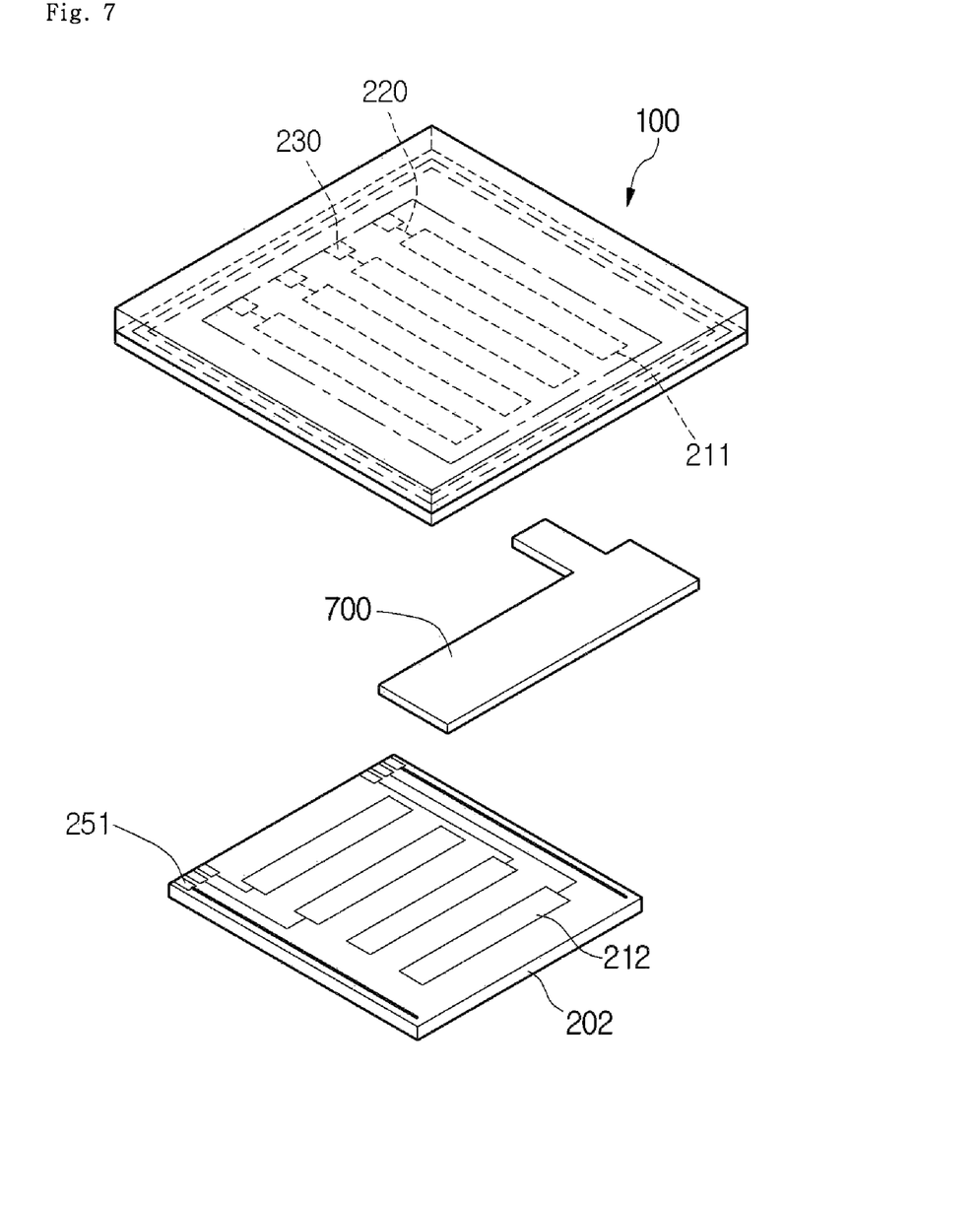

Referring to FIG. 7, the first sensing electrode 211 may be directly formed on a bottom surface of the cover substrate 100. In this case, an electrode substrate to form the first sensing electrode 211 can be omitted and the thickness of the touch window can be reduced.

Figure 8:
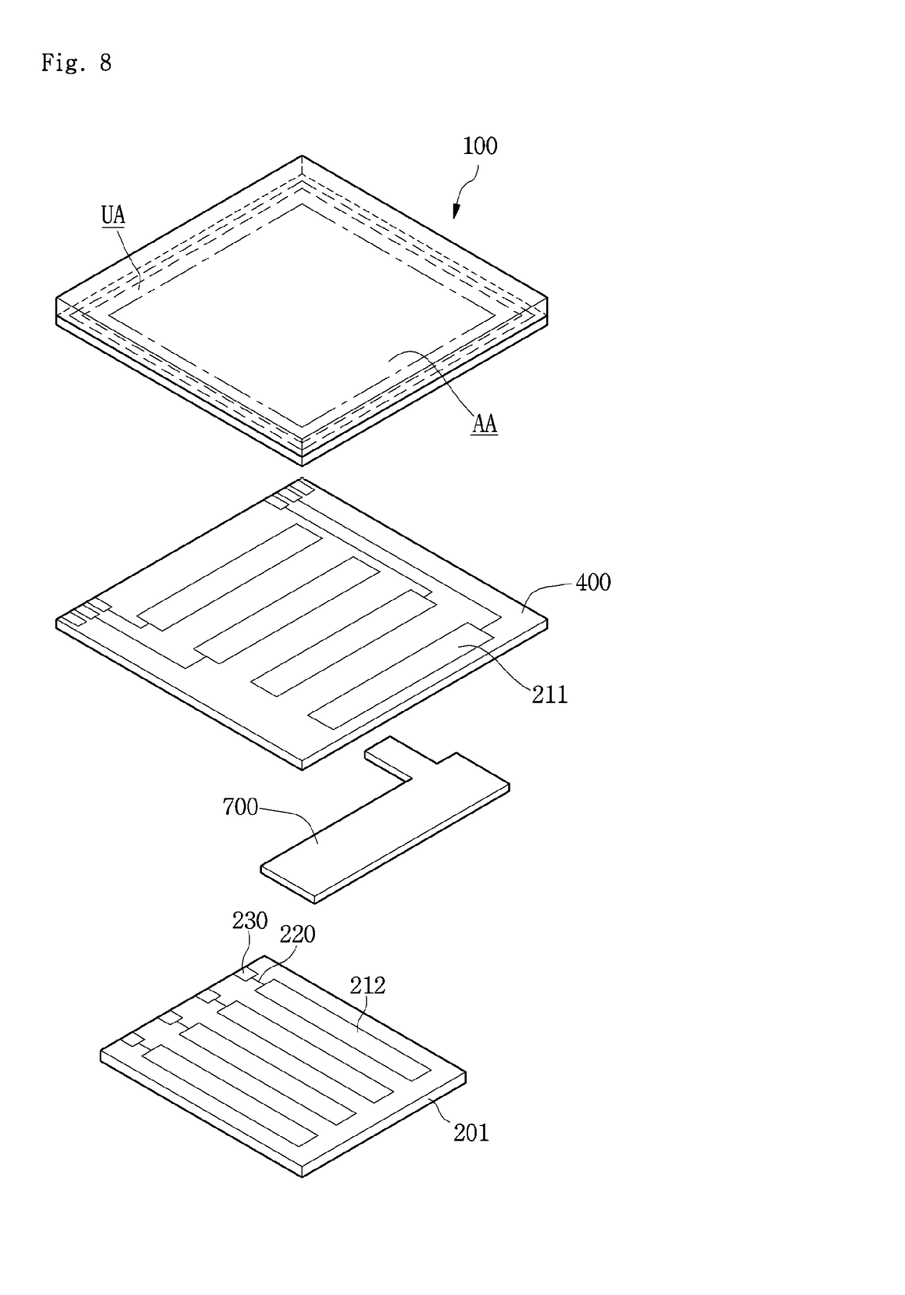

Referring to FIG. 8, in the touch window according to another embodiment, the first sensing electrode 211 may be disposed on an intermediate layer 400 and the second sensing electrode 212 may be disposed on the first substrate 201 disposed under the intermediate layer 400. The first and second sensing electrodes 211 and 212 may be disposed on mutually different substrates, so the touch window may have various structures.

Figure 9:
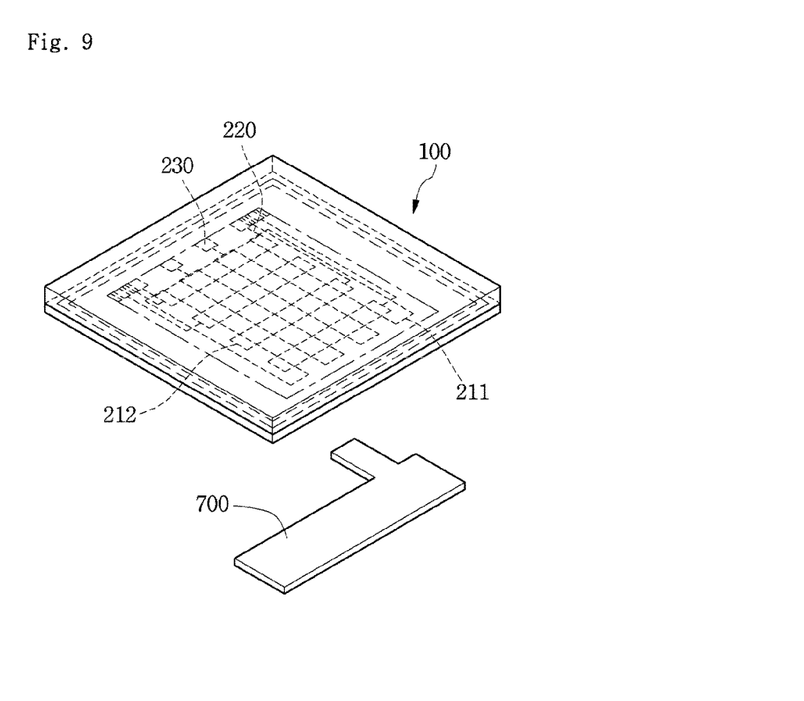

Referring to FIG. 9, in the touch window according to another embodiment, the first sensing electrode 211 and the second sensing electrode 212 may be disposed on the cover substrate 100.

In this case, the first sensing electrode 211 and the second sensing electrode 212 may be insulated from each other on the cover substrate 100.

A bridge electrode (not shown) may be disposed on one surface of the cover substrate 100 on which the sensing electrodes 211 and 212 are disposed. For example, the bridge electrode may be disposed in a bar shape. In detail, the bridge electrodes may be spaced apart from each other by a predetermined interval on the first area AA in the bar shape.

An insulating material (not shown) may be provided on the bridge electrode. In detail, an insulating material may be partially provided on the bridge electrode and a part of the bridge electrode may be covered with the insulating material. For example, when the bridge electrode is formed in a bar shape, the insulating material may be provide on an area except for one end and the opposite end, that is, both ends of the bridge electrode.

The first sensing electrodes 211 may extend while being connected to each other on the insulating material. For example, the first sensing electrodes 211 extending in the first direction may be connected to each other on the insulating material.

In addition, the second sensing electrodes 212 may be connected to the bridge electrode. In detail, the second sensing electrodes 212 spaced apart from each other may be connected to the bridge electrode, such that the second sensing electrodes 212 extend in the second direction.

Thus, the first and second sensing electrodes 211 and 212 may be electrically connected to the bridge electrode without being short-circuited with each other due to the insulating material.

Therefore, a substrate to form the sensing electrodes 211 and 212 may be omitted, so the thickness of the touch window can be reduced.

Hereinafter, a touch device, in which the touch window described above is combined with a display panel, will be described with reference to FIGS. 10 to 13.

Figure 10:
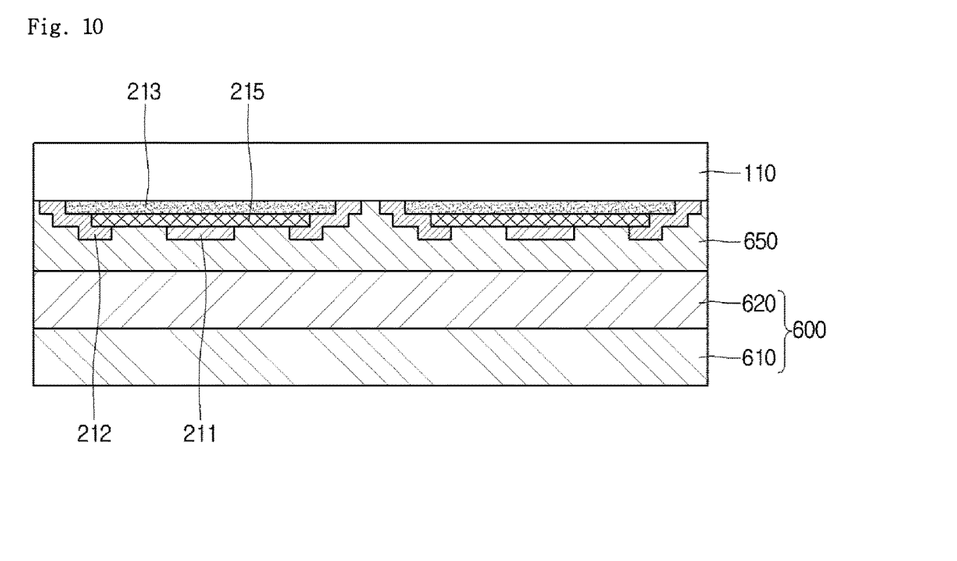
FIGS. 10 to 13 are views showing a touch device, in which a touch window is combined with a display panel, according to an embodiment.

Referring to FIG. 10, the touch device according to the embodiment may include a touch panel disposed on a display panel 600.

In detail, referring to FIG. 10, the touch device may be formed by coupling the cover substrate 100 and the display panel 600 to each other. The cover substrate 100 and the display panel 600 may be bonded to each other through an adhesive layer 700. For example, the cover substrate 100 and the display panel 600 may be combined with each other through the adhesive layer 650 including optical clear adhesive (OCA).

In addition, when a substrate 110 is further disposed on the cover substrate 100, the touch device may be formed by coupling the substrate 110 and the display panel 600. The cover substrate 100 and the display panel 600 may be bonded to each other through the adhesive layer 650. For example, the cover substrate 100 and the display panel 600 may be combined with each other through the adhesive layer 650 including optical clear adhesive (OCA).

Figure 11:
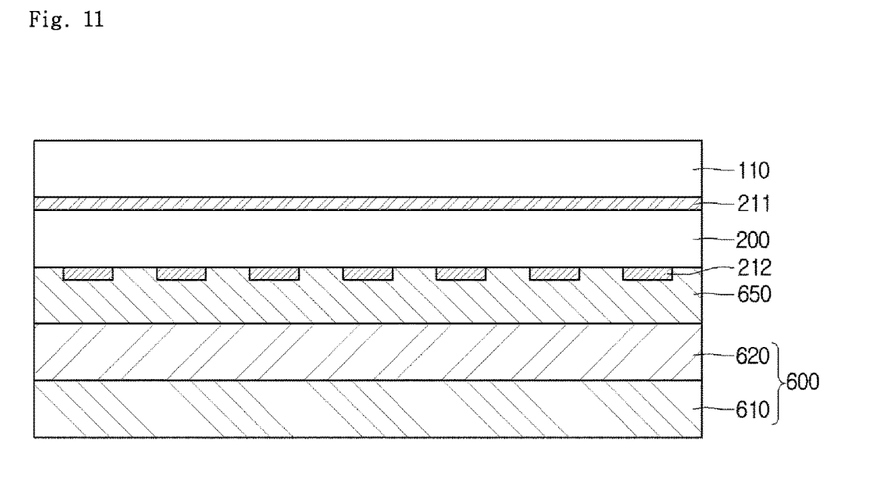

Referring to FIG. 11, the display panel 600 may include first and second panel substrates 610 and 620.

If the display panel 600 is a liquid crystal display panel, the display panel 600 may have a structure in which the first panel substrate 610 including a thin film transistor (TFT) and a pixel electrode is combined with the second panel substrate 620 including color filter layers while a liquid crystal layer is interposed between the first and second panel substrates 610 and 620.

Further, the display panel 600 may be a liquid crystal display panel having a color filter on transistor (COT) structure formed by combining the first panel substrate 610 formed thereon with the TFT, a color filter, and a black matrix with the second panel substrate 620 while the liquid crystal layer is interposed between the first and second panel substrates 610 and 620. In other words, the TFT may be formed on the first panel substrate 610, a protective layer may be formed on the TFT, and the color filter layer may be formed on the protective layer. In addition, the pixel electrode, which makes contact with the TFT, is formed on the first panel substrate 610. In this case, to improve an aperture ratio and simplify a mask process, the black matrix may be omitted, and a common electrode may perform a function of the black matrix together with the inherent function thereof.

In addition, when the display panel 600 is a liquid crystal panel, the display device may further include a backlight unit for providing light at the back of the display panel 600.

When the display panel 600 is an organic electroluminescence light emitting device, the display panel 600 includes a self-luminescence device which does not require any additional light source. A thin film transistor is formed on the first panel substrate 610 of the display panel 600, and an organic light-emitting device (OLED) making contact with the thin film transistor is formed. The OLED may include an anode, a cathode and an organic light-emitting layer formed between the anode and the cathode. In addition, the display panel 600 may further include the second panel substrate 620, which performs the function of an encapsulation substrate for encapsulation, on the OLED.

Figure 12:
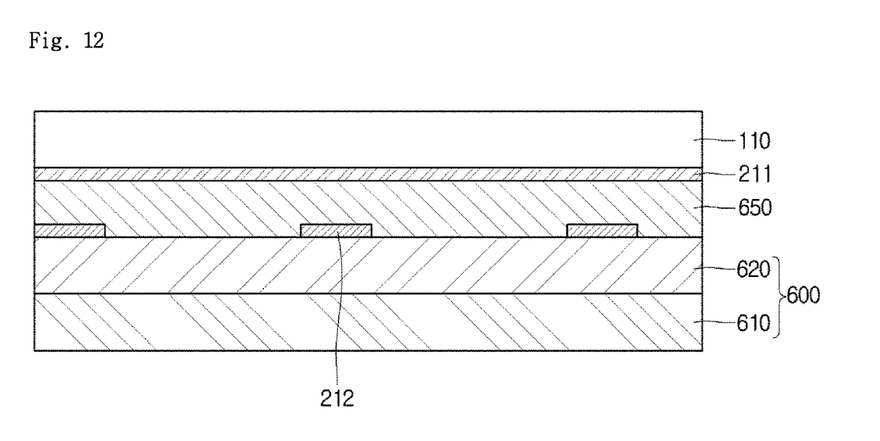

Referring to FIG. 12, a touch device according to an embodiment may include a touch panel formed integrally with the display panel 600. That is, a substrate supporting at least one sensing electrode may be omitted.

In detail, at least one sensing electrode may be disposed on at least one surface of the display panel 600. That is, at least one sensing electrode may be formed on at least one surface of the first or second panel substrate 610 or 620.

In this case, at least one sensing electrode may be formed on a top surface of the substrate disposed at an upper portion.

Referring to FIG. 12, the first sensing electrode 211 may be disposed on one surface of the cover substrate 100. In addition, the first wire connected to the first sensing electrode 211 may be disposed. In addition, the second sensing electrode 212 may be disposed on one surface of the display panel 600. Further, the second wire connected to the second sensing electrode 212 may be disposed.

The adhesive layer 650 may be disposed between the cover substrate 100 and the display panel 600 so that the cover substrate 100 is combined with the display panel 600.

In addition, the cover substrate 100 may further include a polarizing plate below the cover substrate 100. The polarizing plate may be a linear polarizing plate or an anti-reflection polarizing plate. For example, when the display panel 600 is a liquid crystal display panel, the polarizing plate may be a linear polarizing plate. In addition, when the display panel 600 is an organic electroluminescence display panel, the polarizing plate may be an anti-reflection polarizing plate.

According to a touch device of an embodiment, at least one substrate for supporting the sensing electrode may be omitted. Thus, the touch device may have a thin thickness and a light weight.

Hereinafter, a touch device according to still another embodiment will be described with reference to FIG. 13. In the following description, the parts similar or identical to those of the previously described embodiment will be omitted for the purpose of clear and brief description. The same reference numbers will be assigned to the same elements.

Figure 13:
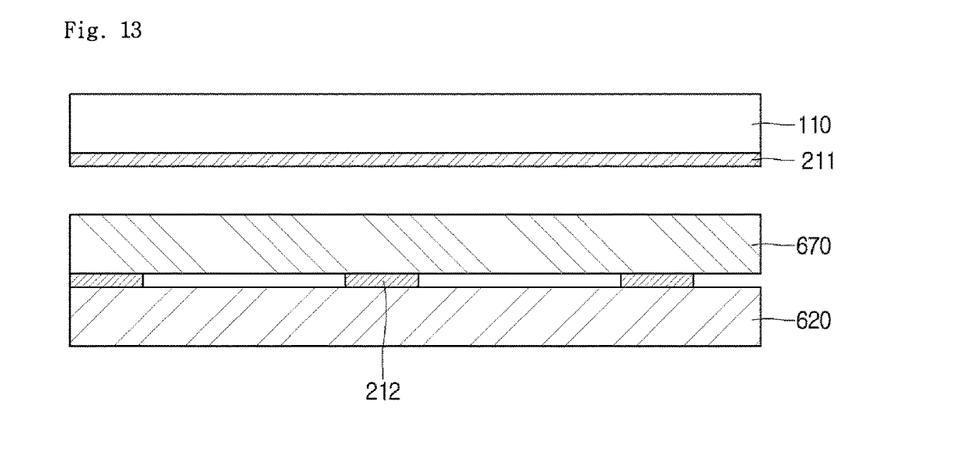

Referring to FIG. 13, a touch device according to an embodiment may include a touch panel integrated with the display panel 600. That is, the substrate for supporting at least one sensing electrode may be omitted.

For example, a sensing electrode, which serves as a sensor disposed in the first area to sense a touch, and a wire, through which an electrical signal is applied to the sensing electrode, may be formed inside the display panel. In detail, at least one sensing electrode or at least one wire may be disposed inside the display panel.

The display panel includes the first and second substrates 610 and 620. In this case, at least one of the first and second sensing electrodes 211 and 212 is disposed between the first and second panel substrates 610 and 620. That is, at least one sensing electrode may be disposed on at least one surface of the first or second substrate 610 or 620.

Referring to FIG. 13, the first sensing electrode 211 may be disposed on one surface of the cover substrate 100. In addition, the first wire connected to the first sensing electrode 211 may be disposed. Further, the second sensing electrode 212 and the second wire may be formed between the first and second panel substrates 610 and 620. That is, the second sensing electrode 212 and the second wire may be disposed inside the display panel, and the first sensing electrode 211 and the first wire may be disposed outside the display panel.

The second sensing electrode 212 and the second wire may be disposed on the top surface of the first panel substrate 610 or the bottom surface of the second panel substrate 620.

In addition, a polarizing plate may be further provided under the cover substrate 100.

When the display panel is a liquid crystal display panel and the second sensing electrode is formed on the top surface of the first substrate 610, the sensing electrode may be formed with a thin film transistor (TFT) or a pixel electrode. In addition, when the second sensing electrode is formed on the bottom surface of the second panel substrate 620, a color filter layer may be formed on the sensing electrode or the sensing electrode may be formed on the color filter layer. When the display panel is an organic electroluminescence light emitting device and the second sensing electrode is formed on the top surface of the first panel substrate 610, the second sensing electrode may be formed with a thin film transistor or an organic light emitting device.

The touch device according to an embodiment may omit at least one substrate supporting a sensing electrode. For this reason, the touch device having a thin thickness and a light weight may be formed. In addition, the sensing electrode and the wire are formed with a device formed on the display panel, so that the process may be simplified and the cost may be reduced.

Hereinafter, one example of a display, to which the touch window according to the embodiments described above is applied, will be described with reference to FIGS. 14 to 17.

Figure 14:
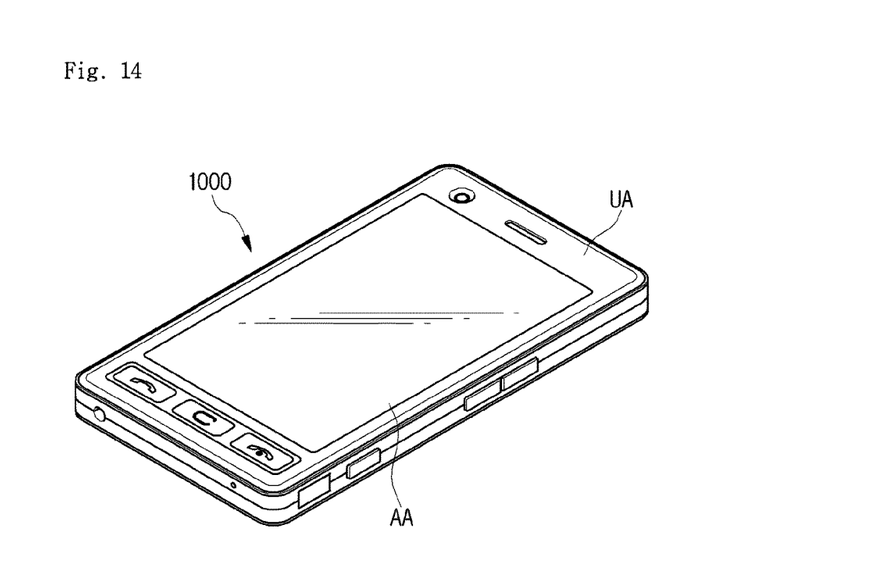
FIGS. 14 to 17 are views showing various touch device systems including the touch device according to an embodiment.

Referring to FIG. 14, a mobile terminal is shown as one example of the touch device. The mobile terminal may include the first area AA and the second area UA. The first area AA may sense a touch signal through the touch by a finger, and a command icon pattern part and a logo may be formed in the second area UA.

Figure 15:
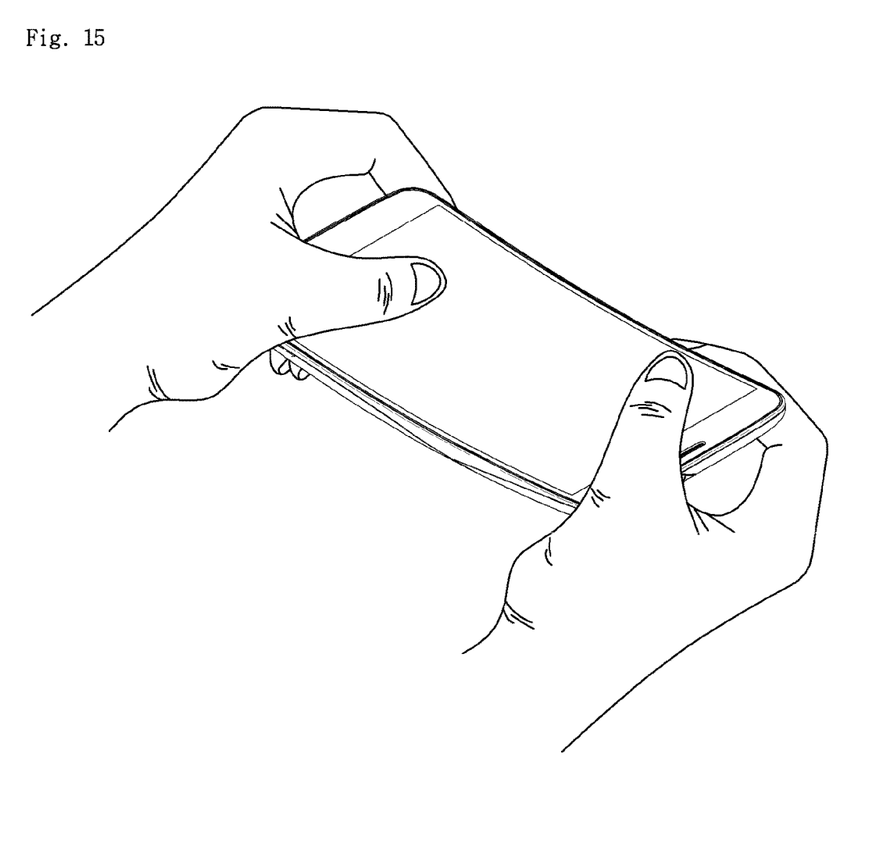

Referring to FIG. 15, the touch window may include a flexible touch window which can be bent. Accordingly, the touch display including the flexible touch window may be a flexible touch display. Thus, a user may bend or flex the flexible touch window with the hand of the user. The flexible touch window may be applied to a wearable device.

Figure 16:
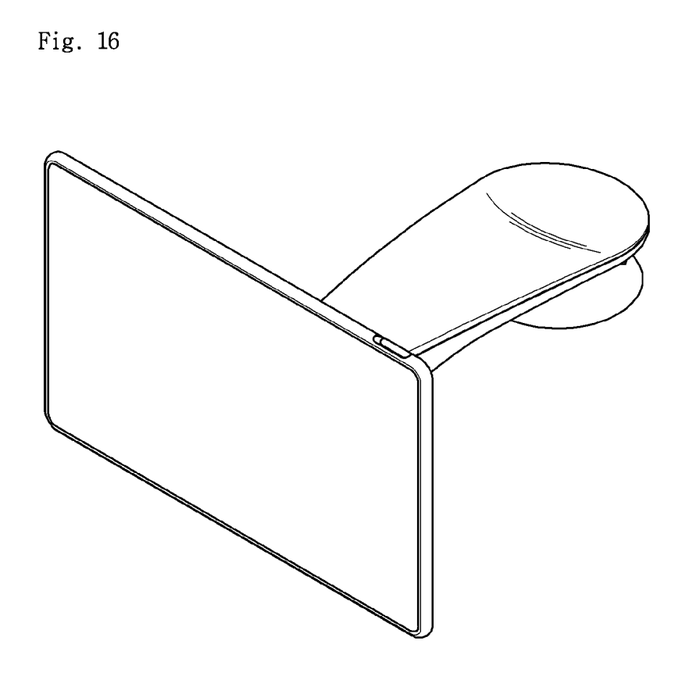

Referring to FIG. 16, the touch window may be applied to a vehicle navigation system as well as a touch device of a mobile terminal.

Figure 17:
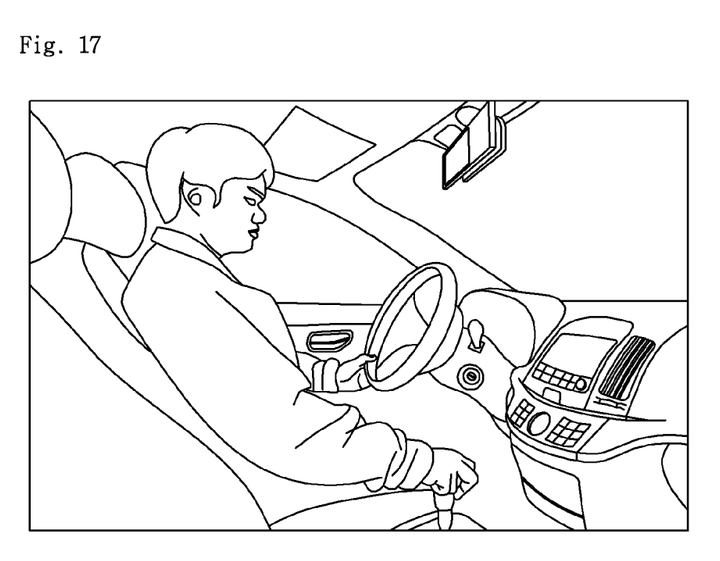

In addition, referring to FIG. 17, the touch window may be applied to an inner part of a vehicle. In other words, the touch window may be applied to various parts in the vehicle. Accordingly, the touch window may be applied to a dashboard as well as a PND (Personal Navigation Display), so that a CID (Center Information Display) may be realized. However, the embodiment is not limited to the above, and such a touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a cover substrate on which a first area and a second area are defined;
a coil on the second area of the cover substrate;
a first substrate on the second area of the cover substrate;
a first wire connected with the coil;
a sensing electrode on the first substrate;
a second wire connected with the sensing electrode; and
a printing layer between the cover substrate and the coil,
wherein the coil and the sensing electrode are disposed on different layers,
wherein the printing layer is in direct physical contact with the cover substrate,
wherein the coil is in direct physical contact with the printing layer,
wherein the sensing electrode is in direct physical contact with the first substrate,
wherein a touch and information input is achieved in the first area,
wherein the first area displays an image,
wherein the second area is provided at two facing ends of a peripheral portion of the first area and does not display an image,
wherein the coil is disposed on the printing layer and is located in the second area,
wherein the coil includes a first coil provided in plurality and a second coil provided in plurality and wherein the first coils and the second coils are alternatively arranged along edges of the second area,
wherein the second coils are spaced apart from the first coils,
wherein the coil does not overlap the sensing electrode,
wherein the printing layer covers the coil and a circuit board,
wherein the coil is connected to the circuit board through a wire and a pad part,
wherein the cover substrate is disposed above the printing layer, the first substrate, the sensing electrode and the coil,
wherein one surface of the printing layer directly makes contact with the second area formed on an opposite surface of the cover substrate and the coil directly makes contact with an opposite surface of the printing layer,
wherein the first and second coils have a closed loop shape,
wherein one surface of the cover substrate is configured to be touched by a digitizer pen,
wherein electromagnetic waves are generated as power is transmitted to the first and second coils, the electromagnetic waves are absorbed in the digitizer pen, and the digitizer pen emits again the electromagnetic waves at a predetermined frequency,
wherein the sensing electrode detects the position of the digitizer pen by sensing electromagnetic variation that occurs according to the approach of the digitizer pen, and
wherein the first wire and the second wire are connected with a same circuit board.

2. The touch window of claim 1, wherein the second area surrounds the first area.

3. The touch window of claim 2, wherein the sensing electrode is disposed on a region of the first substrate which overlaps with the first area.

4. The touch window of claim 1, wherein the sensing electrode senses an electromagnetic field generated by a touch object.

5. The touch window of claim 1, wherein the coil has a function of a ground electrode.

6. The touch window of claim 1, wherein the coil includes an opaque conductive metal.

7. The touch window of claim 1, wherein the first substrate has a size corresponding to the first area of the cover substrate and overlaps with the first area.

8. The touch window of claim 7, wherein the sensing electrode includes a first sensing electrode extending in a first direction and a second sensing electrode extending in a second direction.

9. The touch window of claim 8, further comprising a second substrate under the first substrate, wherein the first sensing electrode is disposed on the first substrate and the second sensing electrode is disposed on one surface of the second substrate.

10. The touch window of claim 8, wherein the first sensing electrode is disposed on the first area of the cover substrate and the second sensing electrode is disposed on the first substrate.

11. The touch window of claim 1, wherein the sensing electrode includes a first sensing electrode extending in a first direction and a second sensing electrode extending in a second direction, and the first and second sensing electrodes are disposed on the first area of the cover substrate.

12. The touch window of claim 1, further comprising at least one panel substrate under the cover substrate, wherein the sensing electrode is disposed on at least one surface of the panel substrate.

13. The touch window of claim 1, wherein the coil is disposed on an upper end and a lower end of the cover substrate.

14. A touch device comprising the touch window of claim 1.

* * * * *